3,253,938
SURFACE COATING POLYESTER RESINS
Thomas Hunt, Cadoxton, Barry, Wales, assignor to The Distillers Company Limited, Edinburgh, Scotland, a British company
No Drawing. Filed May 21, 1962, Ser. No. 196,471
Claims priority, application Great Britain, June 3, 1961, 20,114/61
6 Claims. (Cl. 106—252)

The present invention relates to resins, hereinafter referred to as surface coating resins, from which improved surface coating compositions can be made. In particular it relates to such surface coating resin compositions having improved air drying properties and improved water resistance when dried as films.

It is known that surface coating resins can be prepared by reacting drying oils with unsaturated acids such as maleic acid to produce a product which can be dissolved or dispersed in an aqueous alkali solution to give a surface coating composition. Such compositions have many useful properties but the films formed by applying them to suitable surfaces have very poor water resistance after air drying.

An object of the present invention is to provide surface coating resin compositions, based on reaction products of the type hereinbefore described, which have improved air drying properties and improved water resistance when dried as films.

Accordingly the present invention is a process for the production of a surface coating resin composition which comprises partially esterifying a triglyceride ester of an unsaturated fatty acid having at least 12 carbon atoms in the carbon chain containing the unsaturation and olefinic carboxylic acids or anhydrides thereof having less than 10 carbon atoms in any carbon chain and no cyclic groups with an alcohol containing at least one $\beta,\gamma$-ethylenically unsaturated ether group and dispersing the product in the presence of a base in water or in water containing a water miscible solvent, characterised in that at least 10% of the groups introduced into the reaction product by the partial esterification contain at least one $\beta,\gamma$-ethylenically unsaturated ether groups.

Examples of triglyceride esters of unsaturated fatty acids are tung, oiticica, linseed, soya, cotton seed, dehydrated castor, perilla, tall and unsaturated fish oils.

Minor amounts of synthetic and naturally occurring dienes such as cyclopentadiene, butadiene, gum rosin and myrcene, may be introduced to modify the reaction product of the oil and the carboxylic acid or anhydride thereof.

The carboxylic acids or anhydrides must have less than 10 carbon atoms in any carbon chain, no cyclic groups and olefinic unsaturation. The preferred acids are dicarboxylic acids. Suitable acyclic, olefinic dicarboxylic acids are maleic acid, fumaric acid, aconitic acid, itaconic acid and alkyl-substituted maleic acids having less than 10 carbon atoms in any carbon chain. Suitable acyclic, olefinic monocarboxylic acids are acrylic or methacrylic acids. Specific derivatives are fumaric and maleic acids partially esterified with saturated alcohols containing less than 10 carbon atoms in the chain.

Maleic acid is the preferred acyclic, olefinic carboxylic acid and it is preferred to employ it in the form of maleic anhydride.

The conditions for the reaction of the triglyceride ester of an unsaturated fatty acid and carboxylic acid or anhydride are known and the reaction products for use in the process of the present invention may be prepared by these known procedures. A sufficient amount of the carboxylic acid or anhydride is employed to ensure that the final product is water soluble. By "water soluble" is meant that the product dissolves in water containing a base, for example an alkali metal hydroxide or an ammonia base of the class which consists of ammonia and primary, secondary and tertiary aliphatic, alicyclic or aromatic amines. When maleic acid or maleic anhydride is used the weight ratio of the triglyceride ester of the unsaturated fatty acid to the maleic acid compound can suitably be in the range 1:1 to 19:1.

Preferably the reaction of the triglyceride ester of an unsaturated fatty acid and the carboxylic acid or anhydride is effected by heating the reactants together for an extended period of time at a temperature of at least 110° C. and commonly below 300° C. until substantially all of the carboxylic acid or anhydride is chemically combined with the triglyceride ester of the unsaturated fatty acid. When maleic anhydride is employed to react with linseed oil, the preferred reaction temperature is between 200 and 240° C. and the reaction is carried out under reflux conditions in order to return to the mixture any maleic anhydride which boils or sublimes off. Such reactions suitably employ from 10 to 45% maleic anhydride on the total weight of linseed oil and maleic anhydride, but amounts lower than 10% can be used where the final resin is used in the form of solution in water organic solvent mixtures.

Any mono or polyhydric alcohol containing at least one $\beta,\gamma$-ethylenically unsaturated ether group is suitable for use in the present invention provided that it can react to form ester groups with the carboxylic residues in the oil/acid reaction product and that when the partial esterification of the oil/acid reaction product is complete at least 10% of the groups introduced into the reaction product contain one or more $\beta,\gamma$-ethylenically unsaturated ether groups. Alternatively they can be mixtures of such unsaturated material with saturated alcohols such as for example cyclohexanol or benzyl alcohol can be used. The alcohol ether can for example be derived from allyl, methylallyl, ethallyl, chlorallyl or crotyl alcohol. Particularly suitable alcohol ethers are those containing only one free hydroxyl group. Examples of such compounds are glycerol diallyl ether, and trimethylol propane diallyl ether and pentaerythritol triallyl ether.

The quantity of alcohol required to react to form ester groups in the oil/acid reaction product is arranged so that only partial esterification of the carboxyl groups in the oil/acid reaction product takes place, thus leaving free carboxyl groups in the partially esterified product. For instance this is effected when monohydric alcohols are used by arranging that the number of hydroxyl groups initially present in the reaction mixture is less than the number of carboxyl or potential carboxyl groups in the oil/acid reaction product. Where polyhydric alcohols are used the number of hydroxyl groups present can be more than the number of carboxyl or potential groups and the reaction to form ester groups must be stopped at the required acid value.

The esterification of the oil/acid reaction product with the mono or polyhydride alcohol can be carried out under normal esterification reaction conditions. Most suitably these involve heating the reaction product and the alcohol to temperatures in the range 100–250° C. under nitrogen to the desired acid value. Entrainment with an organic solvent such as xylol can be employed, to remove any water of reaction.

The surface coating resins thus produced are formed into surface coating resin compositions according to the process of the present invention by dispersing them in the presence of a base in water or in water containing a water miscible solvent.

By "dispersing" is meant throughout this specification that the partially esterified product is dissolved in the presence of a base, in water, or in water containing a water miscible solvent, or is dispersed, in the presence of a base, in water, or in water containing a water miscible solvent, to form an emulsion. An example of a suitable base is an ammonia base of the class which consists of ammonia and primary, secondary and tertiary aliphatic, acyclic or aromatic amines.

The final product will dissolve in water, or water containing a water miscible solvent, and a base if a sufficient number of free or potentially free carboxyl groups are present in the resin. It is preferred to use a volatile base such as ammonium hydroxide or a volatile organic amine such as triethylamine to bring about or increase water solubility, because it is to a large extent driven off as free base with the evaporation of water during the formation of the surface coating film from surface coating resin compositions according to the present invention.

If there are insufficient free carboxyl groups or potential carboxyl groups present in the partially esterified product to give water solubility, it can be dispersed in the form of an emulsion in an aqueous solution containing sufficient base to neutralise the free carboxyl or potential carboxyl groups in the resin. It may then be formed into a clear solution by addition of an organic water miscible solvent such as for example ethyl alcohol. An insoluble partially esterified product is obtained when, for example, linseed oil is reacted with less than about 8% by weight of maleic anhydride and the resultant product esterified with a sufficient quantity of the alcohol, to react with about half of the potential carboxyl groups.

Surface coating resin compositions prepared according to the present invention can be used as the basis for valuable paints and the like. The usual metallic driers, fillers, pigments etc. are generally added to such aqueous coating compositions.

The following example illustrate the preparation of a surface coating resin composition according to the present invention.

EXAMPLE 1

*Preparation of maleinised linseed oil.*—Varnish linseed oil (1064 grams) and maleic anhydride (336 grams) were heated and stirred at 220° C. for 7 hours under nitrogen. The maleinised oil was then cooled to room temperature.

*Partial esterification of the maleinised oil.*—255 grams of the maleinised oil described above and 103 grams of glycerol diallyl ether were heated and stirred at 150° C. under nitrogen for one hour. The temperature was raised to 190–195° C. and entrainment of water with xylol commenced. Entrainment was continued to an acid value 60 milligrams KOH/gram. Xylol was then removed by distillation and the ester was allowed to cool below 90° C. Water (200 grams) was charged and 30% ammonia solution was added (ca. 30 grams) with good stirring until a clear solution resulted. The pH of the solution was 8.5.

A water dispersible cobalt drier was added to a sample of this solution (0.12% cobalt on solid resin) and films were applied on glass plates. These films were touch dry in 3 hours and tack free after air drying overnight. The coatings were tough and glossy. The films dried overnight were not dissolved by hot or cold water.

By way of comparison unesterfied maleinised oil was solubilised in a similar manner, and driers added. Air dried films from this solution were instantly dissolved by cold water even after allowing 24 hours for drying.

EXAMPLE 2

*Preparation of maleinised soyabean oil.*—Soyabean oil (1064 grams) and maleic anhydride (336 grams) were heated and stirred at 220° C. under nitrogen for 7 hours. The maleinised oil was then cooled to room temperature.

*Partial esterification of the maleinised oil.*—765 grams of the maleinised soyabean oil described above and 285 grams of glycerol diallyl ether were heated and stirred at 150° C. for 1 hour under nitrogen. The temperature was raised to 190–200° C. and water of reaction removed by entrainment with xylol to an acid value of 70 milligrams KOH/gram. Xylol was removed by distillation and the ester cooled below 90° C. Water (750 grams) was charged and 30% ammonia solution added with stirring until a clear solution resulted. A water dispersible cobalt drier was added to a sample of this solution (0.12% cobalt on solid resin) which was applied to glass plates and allowed to air dry. The films were tack free after drying overnight and could not be dissolved by hot or cold water.

By way of comparison unesterified maleinised soyabean oil was solubilised in a similar manner, and driers added. Air dried films from this solution were instantly dissolved by cold water even after allowing 24 hours for drying.

EXAMPLE 3

*Preparation of a higly maleinised linseed oil.*—Varnish linseed oil (220 grams) and maleic anhydride (180 grams) were heated and stirred at 220° C. under nitrogen for 7 hours. The dark brown oil was allowed to cool.

*Partial esterification of the maleinised oil.*—75 grams of the maleinised oil described above and 56 grams glycerol diallyl ether were heated at 150° C. under nitrogen for 1 hour. The temperature was raised to 190–200° C. and water of reaction entrained with xylol to an acid value of 70 milligrams KOH/gram. The ester was dissolved in ammonia and water in a similar manner to the previous examples.

Films of the resulting solution, with 0.12% cobalt added in the form of water dispersible cobalt driers, air dried to give tack free films after overnight cure. These films were not dissolved by hot or cold water.

EXAMPLE 4

*Preparation of 5% maleinised linseed oil.*—Varnish linseed oil (570 grams) and maleic anhydride (30 grams) were heated and stirred at 220° C. under nitrogen for 7 hours. The maleinised oil was then cooled to room temperature.

*Partial esterification of the maleinised oil.*—444 grams of the maleinised oil described above and 32 grams trimethylol propane diallyl ether were heated at 150° C. under nitrogen for 1 hour. The temperature was raised to 190–200° C. and water of reaction entrained with xylol to an acid value of 22. Xylol was removed by distillation and the ester cooled to room temperature. The ester (10 grams), triethylamine (0.4 gram) and water (10 grams) when stirred vigorously gave an emulsion.

After addition of water dispersible cobalt driers (0.12% cobalt on solid resin), films of the emulsion were applied to glass plates and air dried. The films were tack free after drying overnight and the glossy coating could not be dissolved by hot or cold water.

By way of comparison unesterified maleinised oil was solubilised in a similar manner, and driers added. Air dried films from this solution were readily attacked by cold water even after allowing 24 hours, for drying.

EXAMPLE 5

290 grams of maleinised oil prepared as herein before described in Example 1, 34 grams (0.16 mole) of trimethylol propane diallyl ether and 63 grams (0.63 mole) of cyclohexanol were heated at 150° C. under nitrogen for one hour. The temperature was raised to 190–195° C. and heating continued to an acid value of 65–70.

109 grams of the ester thus formed, 1.25 grams of triethylamine and 109 grams of water were stirred together until a clear solution formed.

After addition of water dispersible cobalt driers (0.12% cobalt on solid resin), films of the solution were applied to glass plates and air dried. The films were tack free after drying overnight and the coating could not be dissolved by hot or cold water.

By way of comparison a cyclohexanol ester of the same maleinised oil processed to an acid value of 65–70, and solubilised as herein before described in this example, was noticeably less tough and water resistant.

I claim:

1. A process for the production of a surface coating resin composition which comprises partially esterifying with an alcohol containing at least one β,γ-ethylenically unsaturated ether group at a temperature in the range of from 100° to 250° C., the reaction product of (a) a triglyceride ester of an unsaturated fatty acid having at least 12 carbon atoms in the carbon chain containing the unsaturation and (b) from 5 to 45 percent by weight of the total weight of reactants initially present of a compound selected from the group consisting of straight chain olefinic mono- and di-carboxylic acids and anhydrides thereof having less than 10 carbon atoms in any chain, said partial esterification yielding a product having an acid value of at least 22 milligrams KOH per gram and dispersing the product in the presence of a base in a medium selected from the group consisting of water and water containing a water-miscible solvent wherein at least 10 percent of the groups introduced into the reaction product by the said partial esterification contain at least one β,γ-ethylenically unsaturated ether group.

2. A process as claimed in claim 1 wherein the triglyceride ester of an unsaturated fatty acid is linseed oil.

3. A process as claimed in claim 1 wherein the carboxylic acid anhydride is maleic anhydride.

4. A process as claimed in claim 1 wherein the β,γ-ethylenically unsaturated ether groups are derived from glycerol diallyl ether.

5. A process as claimed in claim 1 wherein the β,γ-ethylenically unsaturated ether groups are derived from trimethylol propane diallyl ether.

6. A process as claimed in claim 1 wherein the base is ammonium hydroxide.

References Cited by the Examiner

UNITED STATES PATENTS

| | | | |
|---|---|---|---|
| 2,033,132 | 3/1936 | Ellis | 260—404.8 |
| 2,188,884 | 1/1940 | Clocker | 91—68 |
| 2,188,885 | 1/1940 | Clocker | 260—410 |
| 2,374,381 | 4/1945 | Root | 260—23 |
| 2,966,479 | 12/1960 | Fischer | 260—404.8 |

OTHER REFERENCES

Chemical Abstracts: vol. 53, No. 10, May 19, 1959, (page 8659 relied on).

LEON J. BERCOVITZ, *Primary Examiner.*

R. W. GRIFFIN, F. McKELVEY, *Assistant Examiners.*